United States Patent
Herzog

[15] 3,651,918

[45] Mar. 28, 1972

[54] TROUGH CHAIN CONVEYOR

[72] Inventor: Rene Herzog, Niederuzwil, Switzerland

[73] Assignee: Gebrueder Buehler AG, Uzwil, Switzerland

[22] Filed: Apr. 14, 1970

[21] Appl. No.: 28,480

[30] Foreign Application Priority Data

Apr. 15, 1969 Switzerland ..........................5654/69

[52] U.S. Cl. ..................................198/11, 198/94, 198/110
[51] Int. Cl. .......................................B65g 21/12, B65g 65/06
[58] Field of Search ...............................198/11, 88, 91–92, 198/94, 76, 110, 117–118, 121; 214/14

[56] References Cited

UNITED STATES PATENTS

| | | | |
|---|---|---|---|
| 3,519,146 | 7/1970 | Moeller | 198/94 X |
| 946,201 | 1/1910 | Camp | 198/110 X |
| 3,126,089 | 3/1964 | Hugli | 198/171 |
| 2,252,460 | 8/1941 | Sinden | 198/168 |
| 1,421,787 | 7/1922 | Kininmonth | 198/118 X |

FOREIGN PATENTS OR APPLICATIONS 499,954 1/1939 Great Britain .........................198/168

*Primary Examiner*—Edward A. Sroka
*Attorney*—McGlew and Toren

[57] ABSTRACT

A trough chain conveyor for unloading, from the top, vessels such as ships, barges and the like is pivotally supported on a crane with means for arranging the conveyor at a plurality of angles to the vertical. The material is conveyed upwardly through troughs to the upper end of the conveyor and then is unloaded into a discharge container supported on the conveyor. Another conveyor is located on the crane for receiving the unloaded material and completing the unloading operation. The trough chain conveyor contains a pair of laterally spaced endless chain strands reversibly movable through troughs for unloading the material.

6 Claims, 11 Drawing Figures

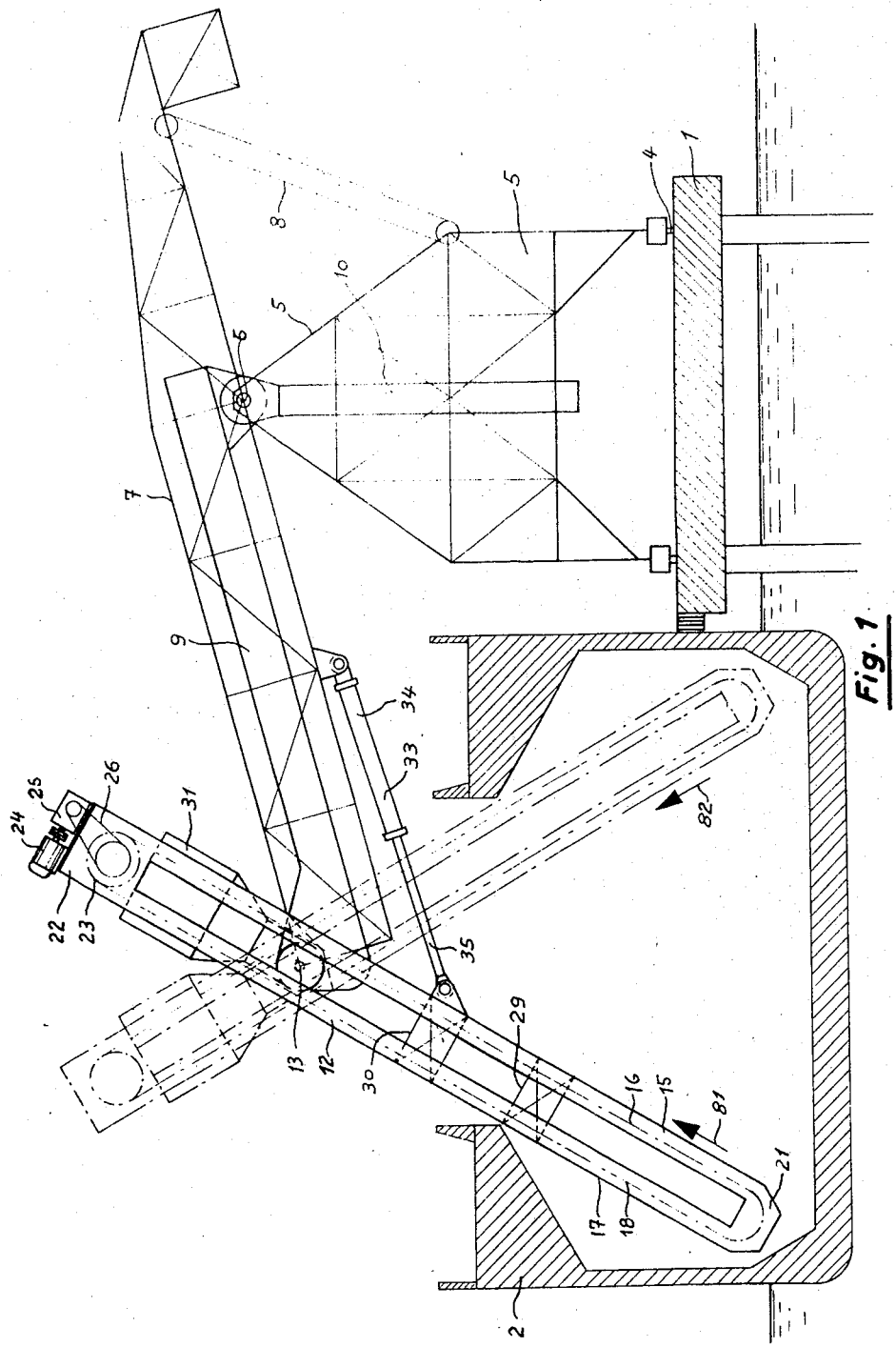

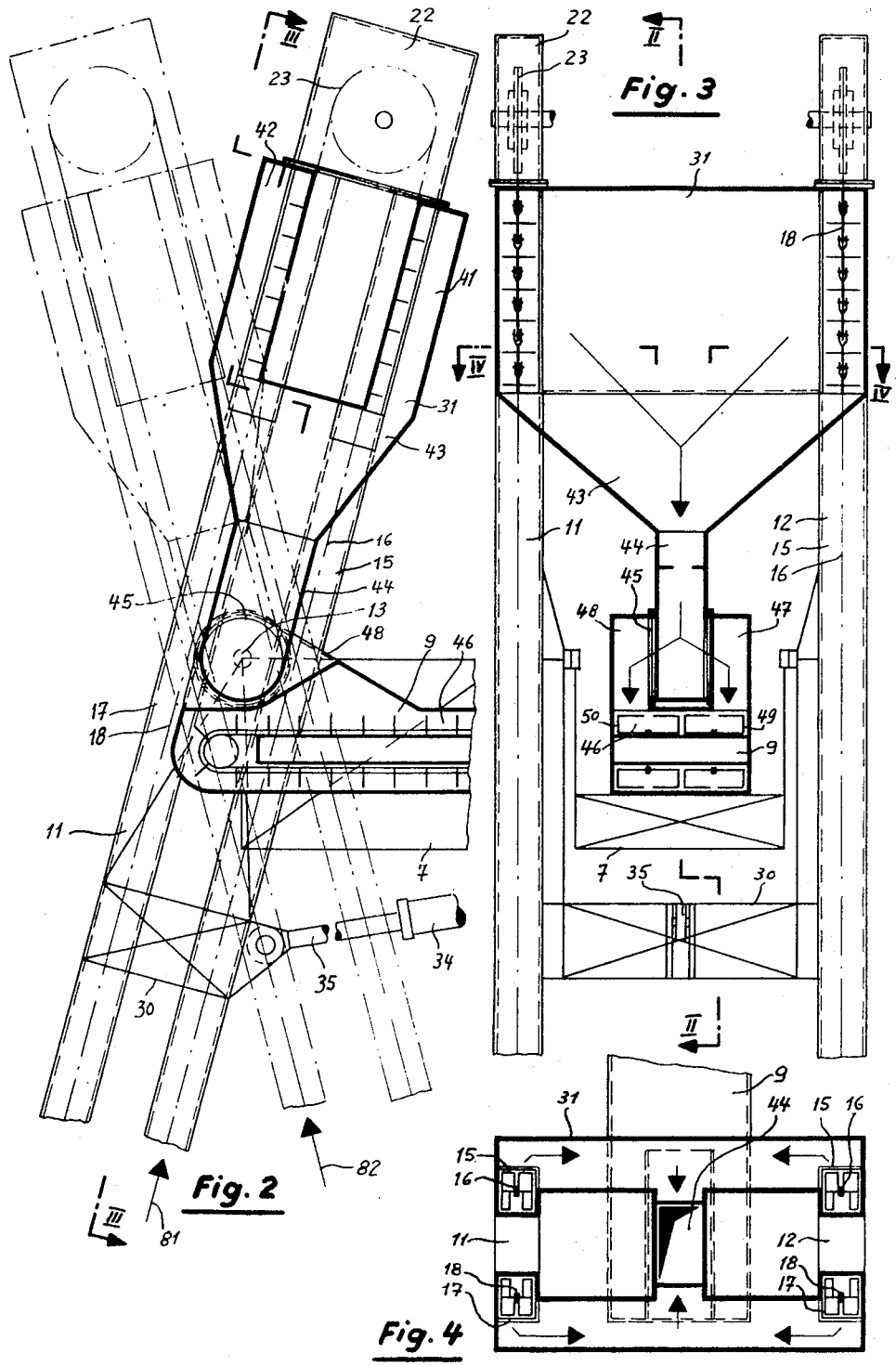

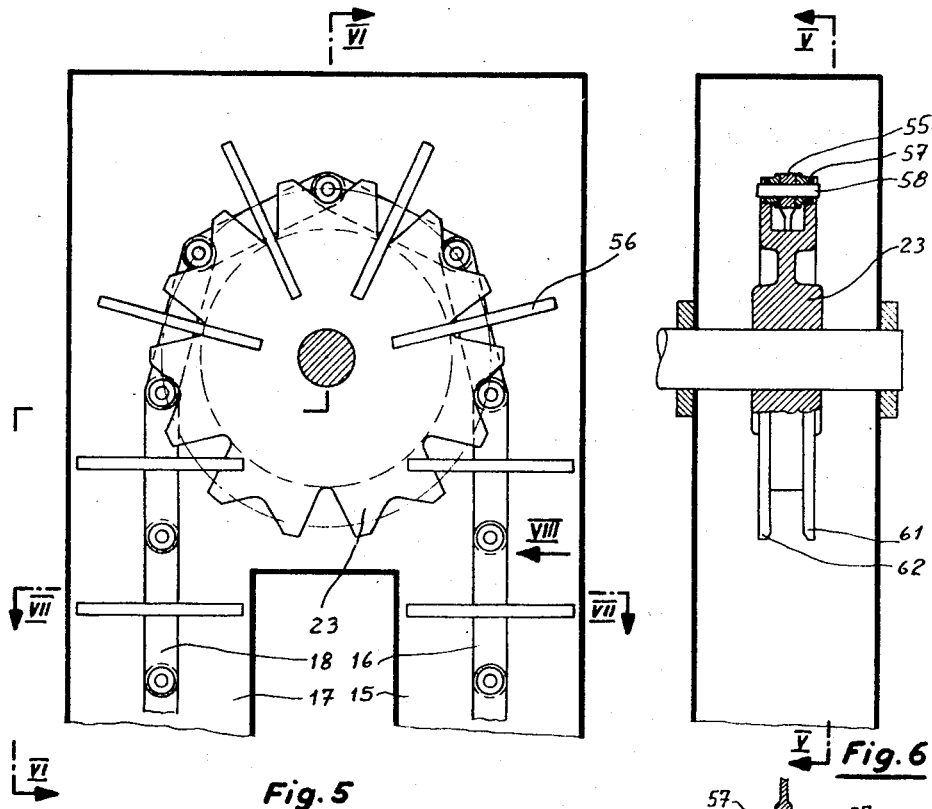
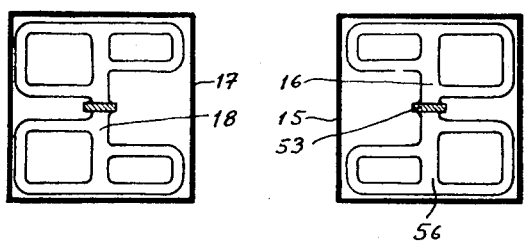
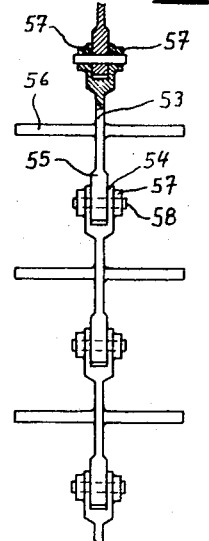
Fig. 5
Fig. 6
Fig. 7
Fig. 8
INVENTOR.
RENÉ HERZOG

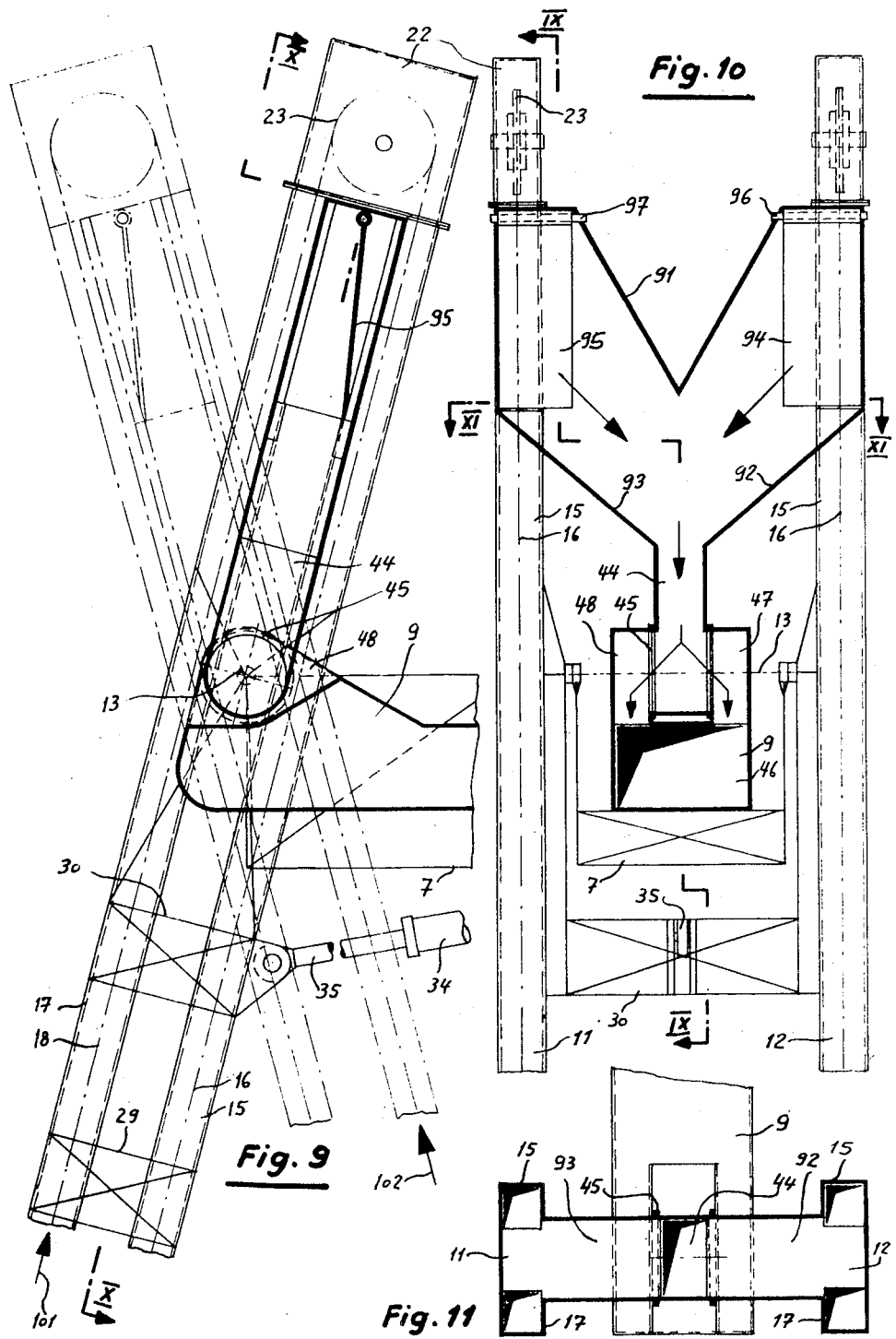

TROUGH CHAIN CONVEYOR

SUMMARY OF THE INVENTION

The present invention is directed to a trough chain conveyor for unloading ships or other vessels through an opening in their tops and, more particularly, it concerns a trough chain conveyor articulated to a lifting crane for movement into a plurality of positions disposed at an angle to the vertical and provided with driving means for reversing the direction of travel of the conveyor. Such trough chain conveyors, by changing their angular position to the vertical, can be positioned across the width of the ship to be unloaded so that special devices for moving the material to be unloaded to the base of the conveyor are not required.

The primary object of the present invention is to afford a simple trough chain conveyor construction which will permit unloading without additional equipment to assist in the unloading operation.

Therefore, in accordance with the present invention, the trough chain conveyor is provided with chain strands containing means for unloading the material through upwardly directed troughs and drive means are provided for the chain strands so that their direction of travel can be reversed. Due to the reversible operation of the conveyor, it is possible to unload material from both sides of a ship so that the entire width of the ship can be unloaded in a convenient manner.

In previously known ship unloading arrangements, the conveyor always ran in a single direction so that the unloading operation on one side of the ship was considerably less efficient than on the other side.

Another distinguishing characteristic of the present invention is the manner in which the material is discharged from the chain strands at the upper end of the trough chain conveyor. The material is unloaded by a pair of laterally spaced chain strands and a discharge container is arranged at the upper ends of the troughs through which the chain strands pass for receiving the material as it reaches the upper end of the unloading troughs. This arrangement makes it possible to unload the material from either side of the chain strands for accommodating its reversible operation and thereby avoids the use of complicated means for discharging the material after it is unloaded by the trough chain conveyor. Further, it is possible to arrange the discharge container so that though the conveyor is tilted from the vertical the material can always empty from the lower side of the chain strands. This feature of the trough chain conveyor operation is made possible by the relatively small chain speed whereby the material can be displaced from the chain strand before the strand reverses direction and passes into the return chain trough.

In one arrangement the material passes from the outer side of the chain strand into the discharge container so that no problem arises in the bypassing of the material into the return chain trough; however, where the material flows from the inner side of the chain strand into the discharge container a pendulum flap is provided to prevent any bypassing into the return trough.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the Drawing:

FIG. 1 is a side view of a unloading device including a trough chain conveyor in accordance with the present invention arranged for unloading a ship tied up to a pier;

FIG. 2 is an enlarged partial view of the trough chain conveyor illustrated in FIG. 1 taken along the line II—II in FIG. 3;

FIG. 3 is a view taken along the line III—III in FIG. 2;

FIG. 4 is a view taken along the centrally offset line IV—IV in FIG. 3;

FIG. 5 is an enlarged detailed view of a portion of the trough chain conveyor shown in FIG. 2, that is, it shows a view of the upper end of the conveyor taken along line V—V in FIG. 6;

FIG. 6 is a sectional view taken along line VI—VI IN FIG. 5;

FIG. 7 is a sectional view taken along line VII—VII in FIG. 5;

FIG. 8 is a vertical view partly in section of a portion of the conveyor chain strand and taken in the direction of the arrow designated VIII in FIG. 5;

FIG. 9 is a view, similar to that shown in FIG. 2 of another embodiment of the trough chain conveyor and is taken along line IX—IX in FIG. 10;

FIG. 10 is a view taken along line X—X in FIG. 9; and

FIG. 11 is a sectional view taken along line XI—XI in FIG. 10.

DETAILED DESCRIPTION OF THE INVENTION

In FIG. 1 a ship 2 is docked at a pier 1 and a lifting crane 3 is positioned on the pier for movement on the rails 4. The crane 3 is formed of a tower 5 which is supported on the rails and a jib 7 is articulated to the top of the tower 5 about a horizontal axis 6. A hoisting device 8 is secured at one end to the tower and at the other end to the jib at a position spaced from the axis 6 so that the opposite end of the jib can be lifted and lowered as required. A conveyor 9 is positioned on the jib and extends from its end positioned over the ship 1 inwardly to a point over a drop pipe 10 which extends downwardly through the tower 5. Drive means for the conveyor 9 have been omitted from FIG. 1 since such drive means are conventional and do not provide any part of the invention.

Secured to the end of the jib 7 located above the ship, are a pair of trough chain conveyors 11 and 12 arranged to unload material from the ship in the upward direction. The conveyors 11 and 12 are articulated to the jib about the horizontal axis 13. Each of the trough chain conveyors 11 and 12 has an endless chain strand formed of a first chain strand 16 which extends through a first chain trough 15 and a second chain strand 18 which extends through a second chain trough 17. The laterally spaced chain troughs 15 and 17 of the trough chain conveyors 11 and 12 are interconnected at their lower ends by an intake base 21 which is of a known construction and at their upper ends by a head 22. In the head 22 a wheel 23 is positioned for driving the chain strand made up of the first chain strand 16 and second chain strand 18, and a motor 24 is provided for reversibly driving the wheel 23 through a transmission device 25 and a chain drive 26.

Between their ends the two trough chain conveyors 11 and 12 are rigidly interconnected by means of struts 29 and 30 and above the struts by means of a transfer device 31 which conducts the material being unloaded from the trough chain conveyors to the conveyor 9 on the jib 7. For varying the orientation of the trough chain conveyors relative to the vertical, a double acting hydraulic piston cylinder 33 is articulated at one end to the jib and at the other end to the strut 30. The hydraulic piston cylinder 33 is composed of a cylinder 34 and a piston rod 35 which is longitudinally extendable from the piston cylinder and is secured at its outer end to the strut 30.

The transfer device 31, which provides a common discharge container for the trough chain conveyors 11 and 12, is formed of a pair of transversely extending boxes 41 and 42 which extend outwardly from the outer sides of the trough chain conveyors, note FIG. 2. At the lower ends of the boxes 41 and 42 a funnel 43 converges downwardly into a drop pipe 44. At the location of the axis 13 the drop pipe is connected by means of a transfer joint 45 with the conveyor 9 on the jib 7. Two supply boxes 47, 48 are located on a trough 46 within which the conveyor 9 is positioned. Because of the large output of the arrangement a pair of conveyor chains 49 and 50 are arranged in the trough 46.

In FIGS. 5 through 8 the arrangement of the chain strand in the trough chain conveyors is illustrated.

The first and second chain strands 16 and 18 which make up the endless chain are composed of a plurality of chain links 53 each having a forked head 54 at one end and a flat plate head 55 at the other. Intermediate the ends of the links, followers 56 are provided for conveying the material through the troughs. On each of the outer sides of the forked head 54 a rigid round projection 57 is formed. The links 53 are connected together by means of bolts 58 which extend through the forked head of one link and the flat plate head of the next link. As can be noted in FIGS. 5 and 6 the drive wheel 23 has a pair of driving gear rings 61 and 62 which are arranged to engage the projections 57 on the chain links for driving the chain strand. Because of this symmetrical arrangement of the chain links, it is possible for the drive wheel to drive the chain strand in either direction.

In the following description of the ship unloading operation, for the sake of simplicity, only one of the trough chain conveyors 11 and 12 is described, however, it should be understood that in normal operation both of the trough chain conveyors function simultaneously.

In FIG. 1 the trough chain conveyors are shown extending downwardly into the ship 2 being supported pivotally from the end of the jib 7 of the crane 3. In FIG. 1 the conveyors are shown in two positions, one in full lines with the intake base 21 located in the lower left-hand corner of the hold within the ship and the other in chain lines with the intake base 21 located in the lower right-hand corner of the hold. In each instance the conveyors are tilted or positioned at an angle to the vertical. The position of the conveyors within the ship's hold can be adjusted by means of the hoist device 8 which pivots the jib 7 and also by the hydraulic piston cylinder 33 which pivotally locates the conveyors about the axis 13 at the end of the jib 7. The material is lifted from the intake base 21 and passes upwardly through one of the troughs 15 and 17.

In the position shown in full lines in FIG. 1 the material is carried upwardly by the first chain strand 16 through the first trough 15 from the intake base 21 to the upper end of the conveyor. The loading of the material from the intake base 21 in this arrangement operates satisfactorily even if the material being unloaded is difficult to handle. When the material being conveyed upwardly in the direction of the arrow 81 through the first trough 15 reaches the level of the transfer device 31 the material passes in an outward and downward direction into the box 41 and continues its downward path from the box into the funnel 43 and then through the drop pipe 44 into the transfer joint 45 and the supply boxes 47, 48 for eventual deposition into the trough 46 of the conveyor 9. The conveyor chains 49 and 50 within the trough 46 transfer the material in the right-hand direction along the jib 7, as seen in FIG. 1, until the material is unloaded into the drop pipe 10. As is apparent from FIG. 1, the drop pipe 10 permits the material to be unloaded into cars standing on the pier 1 or, if desired, onto another conveyor belt mounted on the pier for subsequent movement to another location. Since the tower 5 is mounted for movement along the pier the entire device can be moved in the horizontal direction by moving the tower and, as indicated above, by means of the hoist device 8 and the hydraulic piston cylinder 33 the intake base of the trough conveyors can be moved into the desired position for unloading the ship 2.

If, by retracting the piston rod 35 into the cylinder 34, the trough chain conveyors are moved so that the intake base 21 passes through the vertical plane through the axis 13 and assumes the position shown in chain lines in FIG. 1; then it will not be possible for the device to operate properly because of the reversal in the position of the first and second chain strands. To provide for proper operation, the rotary drive of the motor 24 is reversed and the driving wheel 23 then rotates in the opposite direction. With this reversal in the drive direction of the conveyor, the conveyor as shown in chain lines transfers the material in the direction of the arrow 82 upwardly from the intake base 21 by means of the second chain strand 18 through the second trough 17. At the upper end of the second trough when the material reaches the level of the transfer device 31 it flows in the outward and downward direction into the box 42 and then is conveyed in the manner described above to the drop pipe 10.

It can be noted that a simple unloading arrangement is provided with the reversible operation of the conveyor and with the arrangement of the transfer device 31, extending between the conveyors 11 and 12, which collects the material from each of the conveyors and conducts it downwardly onto the conveyor 9 in the jib 7 without any interference or obstruction with the continuous operation of the conveyors.

In FIGS. 9 to 11 another embodiment of the unloading arrangement is shown for use with material which is relatively easily taken up into the intake base 21 or where additional means are provided for directing the material into the intake base. In this arrangement, as compared to that shown in FIG. 1, it is possible to use the conveyor trough which is located in the upper position while the other or lower trough serves as the chain strand return passage.

At the top of the embodiment disclosed in FIGS. 9 to 11 the trough chain conveyors 11 and 12 are rigidly interconnected by means of a transfer device 91. In this arrangement, since the material is carried upwardly by the second chain strand 18 within the upper or second trough 17, the material when it reaches the transfer device 91 flows inwardly and downwardly as compared to the outward and downward direction of material discharged from the chain strand in the embodiment shown in FIG. 1. The transfer device 1 forms a channel 92 extending inwardly from the conveyor 12 and another channel 93 extending inwardly to between the conveyors from the conveyor 11. At the lower ends of the channels 92 and 93 a drop pipe 44 similar to the one shown in FIG. 3 is provided for conducting the material from the transfer device to the conveyor 9 on the jib 7. Pendulum flaps 94, 95 are pivotally mounted at their upper ends about the axes 96, 97, respectively, and each flap is arranged to swing about its axis between the first and second chain strands 16, 18 of the conveyor with which the flap is associated.

In the position of the conveyors shown in full line in FIG. 9, the second chain strand 18 conveys the material upwardly in the direction of the arrow 101. When the material reaches the level of the transfer device 91, it passes inwardly into the channels 92 and 93 and drops downwardly into the drop pipe 44. Since it is pivotally mounted and the conveyors are disposed at an angle to the vertical, the flap 95 closes the passage to the first chain strand 16 which is passing downwardly through the second trough 15 which acts as a return passage for the chain strand. The flap which may be adjusted by means not shown in the drawing, prevents any bypassing of the material into the chain return trough.

When the trough chain conveyors 11 and 12 are repositioned so that the intake base is on the opposite side of the vertical plane through the axis 13, such as in the position shown by chain lines in FIG. 9, the rotary direction of the drive wheel is reversed and the pendulum flaps will swing to cover the opposite trough, in this instance the second trough 17 which now becomes the return trough. In this new position the first chain strand 16 carries the material upwardly through the first trough 15 in the direction of the arrow 102 into the transfer device 91.

This second embodiment permits a more compact arrangement of the transfer device 91 since the device is wholly contained within the limits of the conveyors and does not extend outwardly from the outer sides of the conveyors as does the transfer device 31.

What is claimed is:

1. A discharge device for unloading a ship, barge, or similar vessel through an opening in its upper surface, comprising a lifting crane, an elongated trough chain conveyor articulated to said lifting crane for placement in an upwardly directed position and for movement about a horizontal axis so that said conveyor is positionable at an angle to the vertical on both sides of a vertical plane through the horizontal axis, said trough chain conveyor comprising a first chain trough and a second chain trough and an endless chain strand extending through said first and second chain trough and having means thereon for lifting material in the upward direction through one of said troughs, means for driving said chain strand in a reversible manner so that the material can be lifted through either of said first and second troughs while the other acts as a return trough for said chain strand; said trough chain conveyor comprising a pair of laterally spaced chain strands, and a discharge container located at the upper end of said conveyor between said chain strands for receiving material conveyed upwardly by said chain strands.

2. A discharge device, as set forth in claim 1, wherein said discharge container is arranged to receive material flowing inwardly thereto from said chain strand located in the upper of said first and second troughs when said trough chain conveyor is positioned at an angle to the vertical, and a pendulum flap pivotally mounted at its upper end within said discharge container for blocking the passage of the material being lifted into the return trough from the one of said first and second troughs acting as the material lift trough.

3. A discharge device, as set forth in claim 2, wherein said trough chain conveyor comprises a pair of laterally spaced chain strands, said discharge container extending laterally outwardly from each of said first and second troughs through which each of said chain strands are driven, said discharge container extending transversely between said chain strands and forming therebetween a common downwardly extending passage, a drop pipe connected to and extending downwardly from the lower end of said discharge container, and a conveyor mounted on said lift crane and positioned below said drop pipe for conveying material from said trough chain conveyor.

4. A discharge container, as set forth in claim 3, wherein said trough chain conveyor comprises a plurality of struts extending laterally between said first and second troughs containing said pair of chain strands.

5. A discharge device for unloading a ship, barge, or similar vessel through an opening in its upper surface, comprising a lifting crane, an elongated trough chain conveyor articulated to said lifting crane for placement in an upwardly directed position and for movement about a horizontal axis so that said conveyor is positionable at an angle to the vertical on both sides of a vertical plane through the horizontal axis, said trough chain conveyor comprising a first chain trough and a second chain trough and an endless chain strand extending through said first and second chain trough and having means thereon for lifting material in the upward direction through one of said troughs, means for driving said chain strand in a reversible manner so that the material can be lifted through either of said first and second troughs while the other acts as a return trough for said chain strand; and a discharge container located at the upper end of said trough chain conveyor above the location at which said conveyor is articulated to said lifting crane, said discharge container extending outwardly from the outer surfaces of said troughs so that said material being lifted can be discharged in an outward and a downward direction thereto from said chain strand when said trough chain conveyor is positioned angularly to the vertical and, in the angular position, the lower portion of said chain strand is utilized for lifting the material to said discharge container.

6. A discharge device, as set forth in claim 5, wherein said lifting crane comprises a movable tower, a jib mounted on said tower for pivotal movement about a horizontal axis, means for displacing said jib through a vertical plane about said horizontal axis, said trough chain conveyor being articulated to said jib on the opposite side of said horizontal axis of said jib from said means for displacing said jib through a vertical plane, means secured to said jib and to said trough chain conveyor for pivoting said trough chain conveyor about its point of articulation of said jib, and a drop pipe mounted in said tower spaced from said trough chain conveyor, said conveyor on said lift crane and located on said jib and arranged to transfer material from said trough chain conveyor to said drop pipe in said tower.

* * * * *